UNITED STATES PATENT OFFICE.

WILLIAM FOX, OF WHEELING, WEST VIRGINIA.

IMPROVEMENT IN THE MANUFACTURE OF GLASS.

Specification forming part of Letters Patent No. 179,906, dated July 18, 1876; application filed June 15, 1876.

*To all whom it may concern:*

Be it known that I, WILLIAM FOX, of Wheeling, West Virginia, have invented a certain new and useful Improvement in the Manufacture of Glass, of which the following is a specification:

The nature of my invention consists in placing the silex and alkali ingredients, which compose the crude mixture from which the glass is to be manufactured, in an open crucible or pot, and subjecting the same at this, the first stage of the process, to the direct action of the heat produced from the rapid burning or combustion of petroleum, or any of the hydrocarbon oils.

The great advantage of thus using petroleum is not confined to the fact that it produces a much greater heat than either wood or coal, important as this advantage is; but it avoids the necessity of adding an ingredient, as is the invariable practice at all glass-works, which through its chemical action shall neutralize the green or other injurious color which the presence of the iron in the alkaline substance imparts, as the fumes and gases generated in the consumption of the hydrocarbon, having free access to the mixture, acts as such neutralizing agent.

It is well known that in the manufacturing of any of the finer qualities of glass an open crucible cannot be used with either wood or coal as fuel, on account of the injurious chemical action of the smoke, sulphur, and ashes which the burning of these fuels throw off, and, consequently, when it is required to produce clear or colorless glass the crucibles or pots have to be covered. Open crucibles or pots with either wood or coal as the fuel are only used for making the ordinary green or bottle glass.

By the use of petroleum or coal-oil, this objection is removed. The raw materials can be melted in an open-top crucible by direct contact with the flame, without danger of tarnish or coloring from smoke, sulphur, or ashes, as mentioned, and producing a superior clear, colorless glass, having a bright polish and hard tough nature, as the fumes or gases generated through the burning of the fuel freely entering the uncovered crucible or pot so intermingle with the ingredients composing the mixture, while it is being melted as to entirely neutralize all injurious or foreign coloring matter, which the ingredients themselves contain in their normal condition, and which the action of the heat eliminates, and also effecting a saving of almost seven-eighths ($\frac{7}{8}$) of the time required to melt the materials in the usual manner in closed pots, with coal as a fuel, and at a saving of more than one-half in cost of fuel and attention. There is also a great advantage in using oil as a fuel in melting the glass materials in closed pots. For instance, it usually requires about forty (40) hours to make a melt with coal, owing to the difficulty to regulate the heat to a nicety or increase it at pleasure, while by the use of oil, either with a spray or in a body, the melt can be made in twelve (12) hours, it giving forth an intense heat, and it being susceptible of being regulated or increased as desired.

Any of the various products of mineral oils will accomplish the result, if of a highly inflammable character and free from deleterious substances; but I find a medium light oil made by distillation from crude petroleum preferable on account of freedom from dirt and residue. The oil is conveyed to the furnace in pipes from the tank into a receiver in the bottom of the furnace, where it is burnt, the supply being regulated by a stop-cock or air-valve. Directly over this receiver is a cylinder or pipe of proper size to secure complete combustion of the oil, through which the flame rises, and is distributed by the draft around the pots or crucibles.

I do not claim any particular style of furnace, or any improvement thereon. Neither do I wish to confine myself to any particular kind of oil; but What I do claim, and desire to secure by Letters Patent, is—

The herein-described process of treating the ingredients of which glass is composed in an open-top crucible or pot by direct contact with the heat, fumes, and gases resulting from the combustion of petroleum or other hydrocarbon, substantially as and for the purpose specified.

WILLIAM FOX.

Witnesses:
JOHN CALLAHAN,
CYRUS B. HOWARD.